United States Patent
Veiga

(10) Patent No.: US 6,350,709 B1
(45) Date of Patent: Feb. 26, 2002

(54) HEAT SEALABLE COATED TEXTILE FABRIC FOR INFLATABLE VEHICLE RESTRAINT SYSTEMS

(75) Inventor: Manuel J. Veiga, Tewksbury, MA (US)

(73) Assignee: Bradford Industries, Inc., Lowell, MA (US)

(*) Notice: Subject to any disclaimer, the term of this patent is extended or adjusted under 35 U.S.C. 154(b) by 0 days.

(21) Appl. No.: 09/452,030

(22) Filed: Nov. 30, 1999

(51) Int. Cl.[7] .............................................. B32B 27/04
(52) U.S. Cl. .......................... 442/71; 442/67; 442/76; 442/149; 442/157; 442/164; 442/172; 442/181; 442/218; 442/286; 442/304; 442/327; 280/728.1; 280/729; 280/733; 428/12; 428/33; 428/34.1; 428/34.3; 428/34.5; 428/34.6; 428/34.7; 428/35.2; 428/36.1; 428/57; 428/58; 428/162; 428/163; 428/166
(58) Field of Search .......................... 428/12, 33, 34.1, 428/34.3, 34.5, 34.6, 34.7, 35.2, 36.1, 36.2, 57, 58, 162, 163, 166; 280/728.1, 729, 733; 442/67, 71, 76, 149, 157, 164, 172, 218, 181, 286, 304, 327

(56) References Cited

U.S. PATENT DOCUMENTS

| | | | |
|---|---|---|---|
| 4,284,682 A | | 8/1981 | Tschirch et al. |
| 5,110,666 A | | 5/1992 | Menzel et al. |
| 5,178,938 A | | 1/1993 | Magistro et al. |
| 5,226,671 A | | 7/1993 | Hill |
| 5,240,765 A | | 8/1993 | Takahashi et al. |
| 5,254,621 A | | 10/1993 | Inoue et al. |
| 5,258,211 A | | 11/1993 | Momii et al. |
| 5,298,317 A | | 3/1994 | Takahashi et al. |
| 5,399,402 A | | 3/1995 | Inoue et al. |
| 5,514,431 A | | 5/1996 | Shimomura |
| 5,529,837 A | * | 6/1996 | Fujiki et al. ................. 428/266 |
| 5,630,620 A | | 5/1997 | Hirai et al. |
| 5,632,057 A | | 5/1997 | Lyden |
| 5,647,079 A | | 7/1997 | Hakamiun et al. |
| 5,651,395 A | | 7/1997 | Graham et al. |
| 5,704,402 A | | 1/1998 | Bowen et al. |
| 5,707,711 A | | 1/1998 | Kitamura |
| 5,721,046 A | | 2/1998 | Shrewsburg |
| 5,863,644 A | | 1/1999 | Bonigk et al. |
| 5,881,776 A | | 3/1999 | Beasley, Jr. |
| 5,921,287 A | | 7/1999 | Bowen et al. |
| 6,037,279 A | * | 3/2000 | Brookman et al. ............ 442/71 |
| 6,149,194 A | * | 11/2000 | Breed et al. .............. 280/743.1 |
| 6,169,043 B1 | * | 1/2001 | Li ................................ 442/71 |
| 6,177,365 B1 | * | 1/2001 | Li ................................ 442/71 |
| 6,177,366 B1 | * | 1/2001 | Li ................................ 442/71 |
| 6,200,915 B1 | * | 3/2001 | Adams et al. ............... 442/157 |
| 6,220,309 B1 | * | 4/2001 | Sollars, Jr. .................. 139/389 |
| 6,239,046 B1 | * | 5/2001 | Veiga et al. ................... 442/76 |
| 6,250,668 B1 | * | 6/2001 | Breed et al. .............. 280/730.2 |
| 2001/0005660 A1 | * | 6/2001 | Li et al. ........................ 442/71 |
| 2001/0009829 A1 | * | 7/2001 | Sollars, Jr. et al. ........... 442/76 |

* cited by examiner

Primary Examiner—Cheryl Juska
Assistant Examiner—Arti R. Singh
(74) Attorney, Agent, or Firm—Abelman, Frayne & Schwab

(57) ABSTRACT

A coated textile fabric is disclosed for manufacturing an air holding device for a vehicle restraint system, including a base woven, knitted or non-woven base textile fabric having a first surface and a second surface. The base textile fabric is completely or partially coated with an adhesive polyurethane to form a first coating layer, the first coating layer being coated with a second composite coating layer. The second composite coating layer is preferably a polyurethane, a polysiloxane, and an epoxy resin which acts as a filler and adhesion promoter. A third coating layer is formed of a polymeric polyurethane material coated on the second composite layer. A method of producing the coated textile fabric is also disclosed. A heat sealing die for forming sealing beads to seal such coated textile fabrics to form air holding devices is also disclosed.

14 Claims, 3 Drawing Sheets

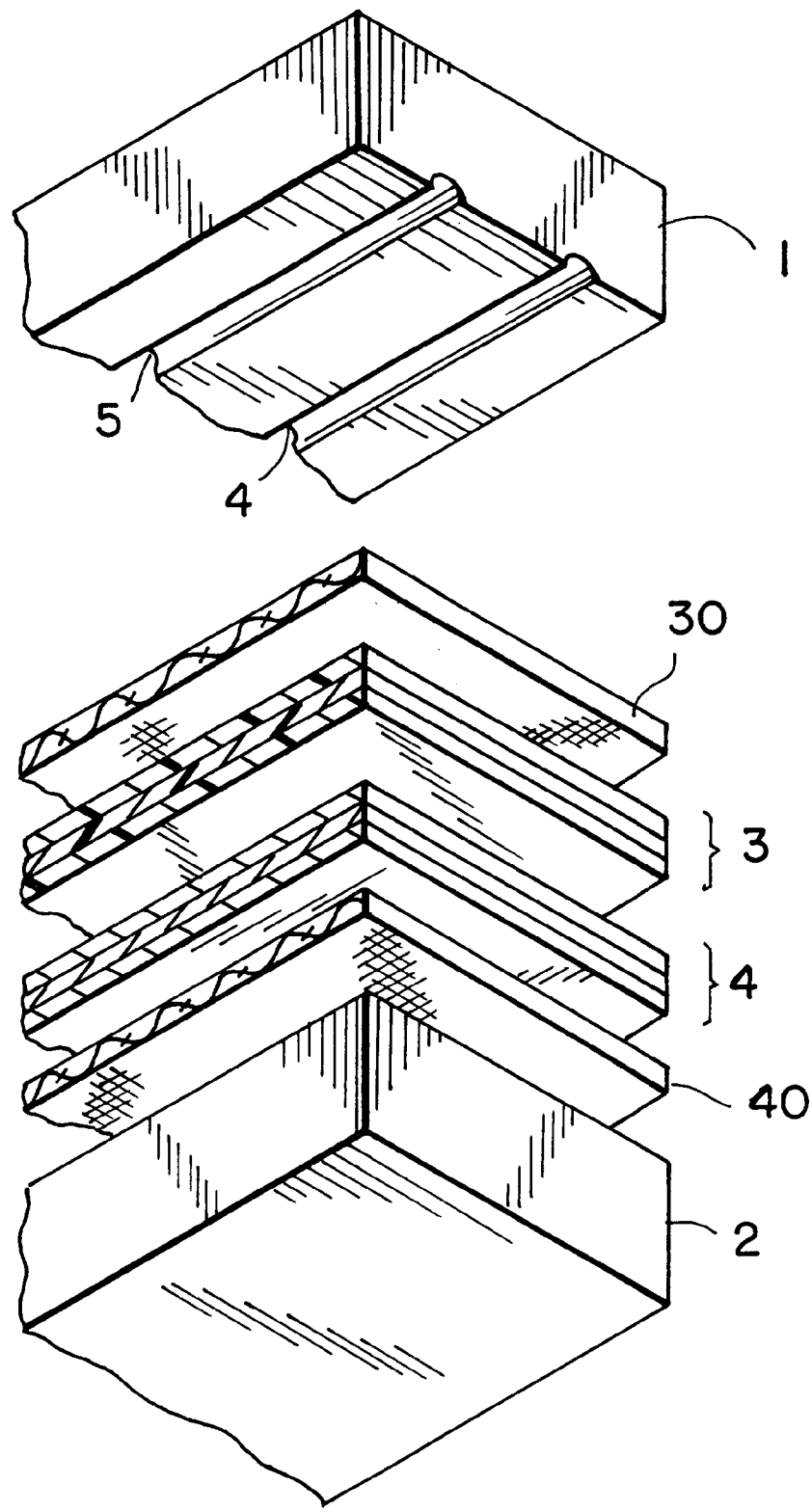

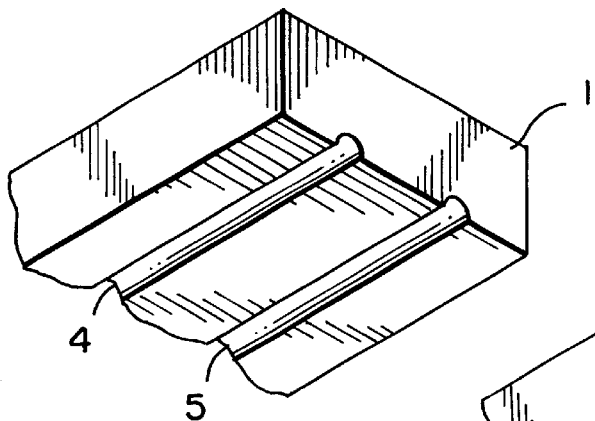
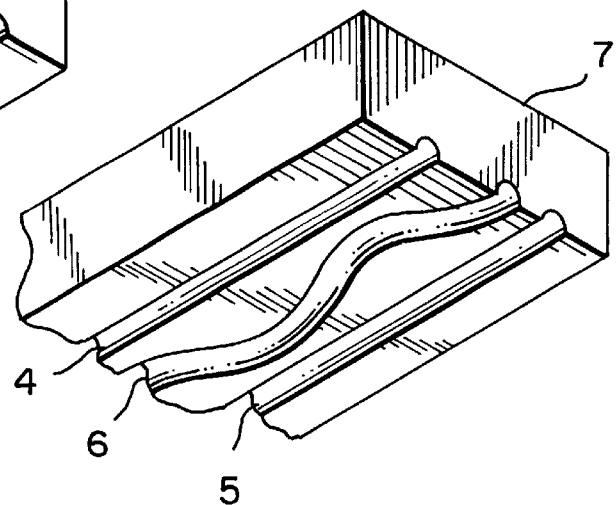
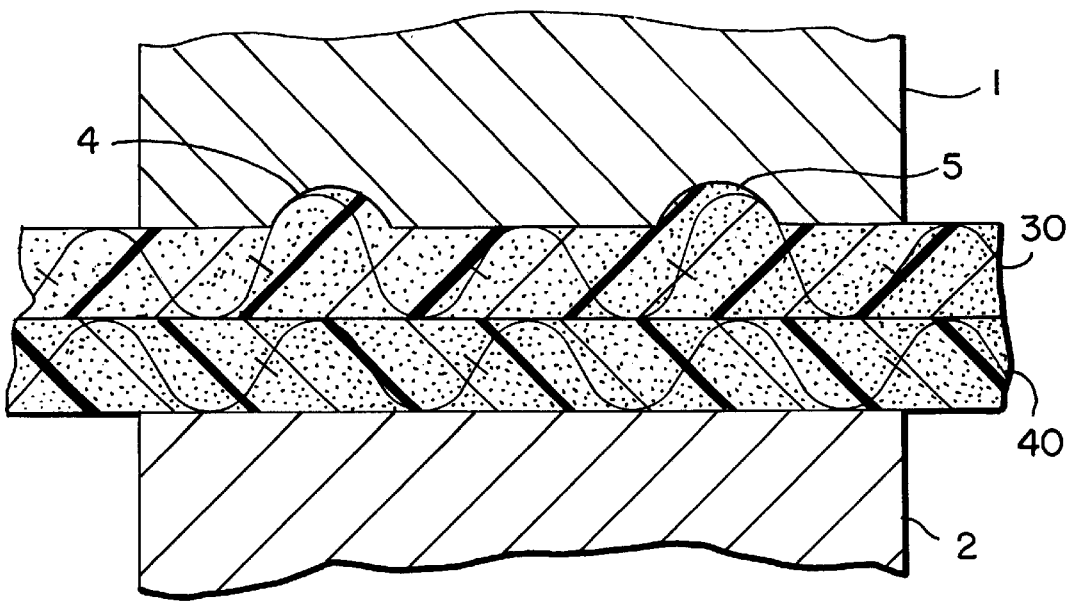

HEAT SEALABLE COATED TEXTILE FABRIC FOR INFLATABLE VEHICLE RESTRAINT SYSTEMS

BACKGROUND OF THE INVENTION

1. Field of the Invention

This invention relates to coated textile fabric used in the manufacture of inflatable devices such as air bags, side air curtains or the like, for vehicle occupant restraint systems. More particularly, the invention relates to woven or knitted textile fabrics coated with a plurality of polymeric layers that impart superior air holding and heat sealable properties to the fabric. The polymeric coatings of the invention form a bead when heat sealed, thus providing a reinforced heat seal bond that permits the manufacture of preformed air holding channels and/or side air curtains that will withstand the explosive pressure of inflation gas when the air bag is deployed.

2. Description of the Related Art

Present restraint systems for automotive vehicles include driver and passenger side air bags that are instantaneously gas-inflated by explosion of a pyrotechnic material at the time of a collision to provide a protective barrier between vehicle occupants and the vehicle structure. Much of the impact of a collision is absorbed by the air bag, thus preventing or lessening the possibility of serious bodily injury to occupants of the vehicle. Air bags are located, typically, in a collapsed, folded condition housed in the steering wheel, to protect the driver, and in the dashboard, to protect a passenger seated next to the driver. Recently, the automotive industry has introduced air bags that are stored in the back of the front seats or in the rear seats to protect the cabin occupants in the event of a collision occurring on either side of the vehicle. More recently still, another safety feature that has been made available for passenger vehicles, especially the so-called sport utility vehicles or SUVs, includes side-impact protective inflatable side air curtains designed to provide a cushioning effect in the event of side collisions or rollover accidents. These side air curtains are stored uninflated in the roof of the vehicle and, in the event of a collision, deploy along the interior side walls of the cabin of the SUV.

Each of these various types of air bags and side air curtains has distinct design and physical property requirements, such as gas (air) holding permeability, air pressure and volume control, and puncture resistance. For example, driver side air bags, which inflate and deflate almost immediately thereafter, must have little or no permeability. Passenger side air bags, on the other hand, require a controlled permeability. Moreover, all such vehicle air restraint devices must have superior packageability and anti-blocking qualities. Packageability refers to the ability of a relatively large device such as an air bag to be packaged in a relatively small space as, for example, within a steering wheel. Anti-blocking refers to the ability of the device to deploy practically instantaneously without any resistance caused by the material sticking to itself, particularly after being stored for relatively long periods of time before it is deployed. These and other properties are determined in large part by the type of fabric used, whether it is knitted or woven, and most importantly, the nature of the coatings that are used on the fabric.

The air holding capability of side air curtains is critical since these safety devices must remain inflated for an extended period of time to protect passengers in multiple rollovers. Unlike air bags which are designed to inflate instantaneously, and to deflate almost immediately after inflation in order to avoid injury to the driver and front seat passenger, side air curtains used in SUTs, or in ordinary passenger vehicles, must be capable of remaining inflated in the range of from about three (3) to about twelve (12) seconds, depending upon the size of the air curtain and the size and type of vehicle involved. An average passenger vehicle would require a side air curtain of from about 60 inches to about 120 inches in length as measured along the length of the vehicle. A larger vehicle, such as a minivan, would require an even longer side air curtain. The maximum inflation period of a side air curtain should be sufficient to protect the cabin occupants during three (3) rollovers, the maximum usually experienced in such incidents.

When side air curtains are deployed, they may be subjected to pressures within a relatively broad range, depending upon their specific location or application. For example, air bag deployment pressures are generally in the range of from about 50 kilopascals (kpa) to about 450 kpa, which corresponds generally to a range of from about 7.4 psi (pounds per square inch) to about 66.2 psi. Accordingly, there is a need for fabric products and air bags which can be made to be relatively impermeable to fluids under such anticipated pressures while being relatively light in weight.

One means of improving air holding capability in vehicle restraint systems has been through coatings such as chloroprene and silicone rubber coatings, applied to the textile (e.g., nylon) substrate. U.S. Pat. No. 5,110,666 discloses a woven nylon substrate coated with polyurethane to provide the desired permeability and retention of inflation gas. Nevertheless, wherever coated fabrics are used the problems of controlling air permeability, air pressure and volume remain. Additionally, in the manufacture of air bags in which stitching is used to form the bag structure, each stitch creates a potential leak that adversely affects the integrity and air holding capability of the bag, especially when instantaneous deployment of an operative bag is required. Insufficiency of adhesion of the coating to the fabric substrate also is a serious problem that must be addressed. For example, the smoother the substrate surface, generally the more difficult it is to obtain strong adhesion of the coating material to the substrate. With some coatings such as silicone rubber (polysiloxane), radio frequency (RF) heat sealing techniques cannot be used to form the air bag because this material will not flow at heat sealing temperatures. In such instances, air bags are usually made by stitching, a process which requires the addition of an adhesive sealant, ultrasonic weld, RF weld or other type of fusion process in the stitched areas. Even so, as noted, leakage of air may occur at the stitching, which lessens the protective capability of the air bag.

There have recently been developed improved polyurethane, acrylic, polyamide and silicone coatings that are coated in layers on the fabric substrates. It has been found that adhesion characteristics are greatly improved with such layered coatings. Examples of such coated fabrics and methods of coating such fabrics are disclosed in commonly assigned applications Ser. No. 09/327,243, now U.S. Pat. No. 6,239,046, Ser. No. 09/327,244, and 09/327,245 both abandoned, filed Jun. 7, 1999, the disclosures of which are incorporated herein by reference and made a part of this disclosure.

U.S. Pat. No. 5,863,644 discloses woven or laid structures using hybrid yarns comprising reinforcing filaments and lower melting matrix filaments comprised of thermoplastic polymers to form textile sheet materials of adjustable gas and/or liquid permeability. During the formation of textile fabrics in accordance with the disclosure, polyester fibers in the weaves are melted by the application of heat to form textile sheet materials that are stated to have predetermined gas and/or liquid permeability. I have invented a coated textile fabric for air holding devices in inflatable vehicle restraint systems which can be heat sealed to withstand inflation pressures in a controlled and improved manner and without stitching.

SUMMARY OF THE INVENTION

It has been found that a textile fabric substrate, when coated with a multi-layered polymeric coating, including a composite coating layer of polyurethane polymer and polysiloxane. Preferably a suitable adhesion promoter and filler such as epoxy resin is added to the composite coating layer. The composite layer facilitates the formation of a sealing bead when heat sealed with a similarly coated fabric, to provide a reinforced heat seal bond. The exceptional bonding properties thus obtained permit the manufacture of an air bag or side air curtain with preformed air holding channels that will be able to withstand the pressure of inflation gas without the need for stitching.

The coatings of this invention can be applied directly onto the textile substrate itself or indirectly by transfer coating to a coated carrier sheet. Multiple reinforced seals can be generated with a bead effect by means of a RF (radio frequency) heat sealing bar having predesigned bead cavities in the die. During the heat sealing process the components that together comprise the composite coating layer of the invention flow at different temperatures, thus creating a bead in the preformed die cavity design. In this process, when heat is applied in a predetermined temperature range, the polyurethane polymer flows into the preformed cavity of the die, thus creating a bead, while the polysiloxane does not flow at the heat sealing temperatures utilized. Vulcanization of the polysiloxane takes place at the time of, or immediately after formation of the bead to bond the polymeric layers together. In addition to its major components of polyurethane and polysiloxane, in the preferred embodiment the composite coating layer would also include an adhesion promoter and filler such as an epoxy resin and may also include solvents, fillers and an ultraviolet light absorber to indicate where the flow of the seal bond is taking place for purposes of inspection under an ultraviolet light. Other additives which act as adhesion promoters and fillers which are comparable to epoxy resin are also contemplated.

A method of producing a coated textile fabric for an air holding device in a vehicle restraint system is also disclosed, which comprises taking a base textile fabric having first and second surfaces, coating a first layer of an adhesive polyurethane onto the first surface of the textile fabric, and drying the first layer at an elevated temperature to form a first coating layer. The method further comprises coating a composite coating layer which includes a polyurethane and a polysiloxane onto the first coating layer and drying the composite coating layer at an elevated temperature to form a second coating layer. The method further comprises coating a third polyurethane layer onto the second composite coating layer and drying the third polyurethane layer.

A heat sealing die for sealing coated air bag fabrics is also disclosed, which comprises a heat sealing bar having a generally planar surface, and a combination of straight and arcuate cavities in the planar surface. The cavities are positioned in predetermined relative positions and orientations to form sealing beads on the coated air bag fabrics. The cavities each have an arcuate cross-sectional configuration to form sealing beads having corresponding cross-sectional configurations.

BRIEF DESCRIPTION OF THE DRAWINGS

Preferred embodiments of the invention are described hereinbelow with reference to the drawings, wherein:

FIG. 3 is an exploded perspective view from below, of the heating dies with the fabrics and coating materials positioned for heat sealing in accordance with the invention;

FIG. 4 is a partial perspective view from below, of one form of heating die with preformed bead cavities;

FIG. 5 is a partial perspective view from below, of an alternative form of heating die having alternative preformed bead cavities; and FIG. 6 is a cross-sectional view of the heating die of FIG. 4 in the closed position with a mating flat surface heating die, illustrating the coated fabrics of the invention heat sealed together with a pair of beads formed by the dies.

DETAILED DESCRIPTION OF THE INVENTION

Figure 1:
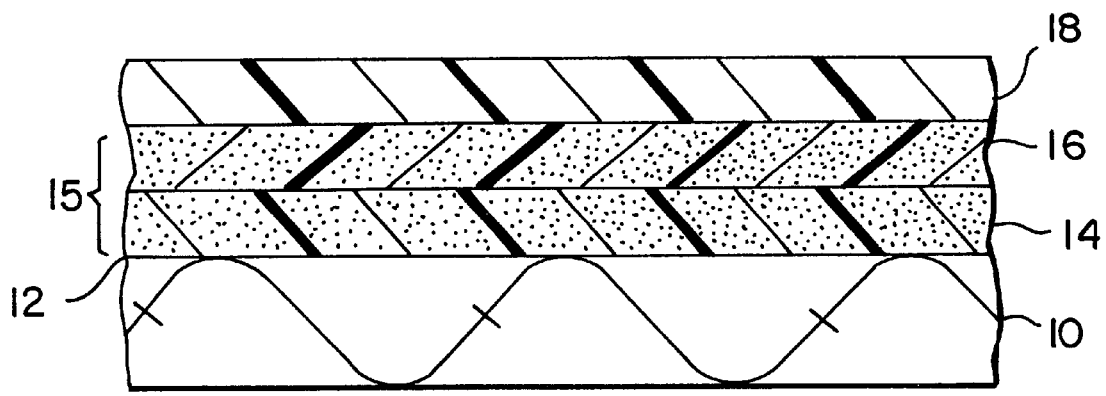
FIG. 1 is a cross-sectional view of a typical coated base fabric of the invention.

The present invention relates to a coated textile fabric that can be joined by heat sealing to form an inflatable air holding device such as an air bag or a side air curtain, for a vehicle restraint system. The air holding device can be produced by coating such fabrics with multiple polymeric layers, including a composite coating layer of polyurethane polymer and polysiloxane, with the preferred addition of an epoxy resin, to produce a product that can be joined by heat sealing with a similarly coated fabric. The heat seal bonding properties of these coated fabrics are greatly enhanced by the formation of a bead which reinforces the heat seal and permits the production of side air curtains having various preformed shapes without the use of stitching. In forming these coated fabrics, a base fabric substrate is first coated on a first side with a prime coat of an adhesive polyurethane layer to enhance adhesion of subsequent layers and to control the penetration of a second composite coating layer into the textile. The fabric is thereafter coated with a non-sticking polyurethane top coat.

The composite coating layer of the invention comprises a mixture of polymeric polyurethane and polysiloxane, with the preferred addition of an epoxy resin which is introduced to promote heat sealing and adhesion of the mixture to polyamide, polyester or other synthetic polyolefin fibers. The polyurethane polymer in the composite mixture will flow at heat sealing temperatures of from about 380° F. to 420° F., while the polysiloxane component will not flow at these temperatures. As a result, the polyurethane polymer will flow into the die cavity formed when the heat sealing bar is closed, while the polysiloxane, which is incompatible with the polyurethane, and does not flow at such temperature, will cross-link or vulcanize. This produces a polyurethane reinforcing bead in the heat seal bond, while the vulcanized polysiloxane prevents the polyurethane from flowing into the textile substrate. A catalyst is added to the polymeric composite mixture to promote vulcanization of the polysiloxane at a temperature of from about 375° F. to about 400° F. The polysiloxane is resistant to heat up to a temperature of about 600° F. after vulcanization.

The polyurethane prime coat is comprised of from about 20 to about 50 weight percent polyurethane, with the remainder of the formulation being solvent, biocide and ultraviolet stabilizer. The polymeric composite compound used for the composite layer is comprised of from about 40 to about 100 weight percent polyurethane, from about 5 to about 25 weight percent polysiloxane, from about 5 to about 25 weight percent epoxy resin, with the remainder of the formulation being comprised of solvent, biocide and ultraviolet stabilizer. The polyurethane topcoat, or finish coat, is comprised of from about 15 to about 35 weight percent of polyurethane.

The opposite (or second) side of the fabric may be coated or uncoated. In the coated embodiment, the second surface coating may be either polyurethane or polysiloxane based. The polyurethane topcoat is comprised of from about 40 to about 100 weight percent polyurethane, from about 5 to about 25 weight percent epoxy resin, with the remainder of the composition being comprised of biocide, ultraviolet stabilizers, fillers and adhesion promoters. The polysiloxane coating is comprised of from about 5 to about 25 weight percent polysiloxane and from about 5 to about 25 weight percent epoxy resin filler or other suitable fillers or adhesion promoters.

Either natural or synthetic knit, woven or non-woven fabric can be employed as the textile substrate, with substrates of polyamide or polyester fibers being preferred. Woven nylon as the fabric substrate is especially preferred. Any denier size, fiber shape or weaving configuration can be employed to advantage in the invention. The shape or configuration of the air holding restraint device utilized in the system will depend upon its ultimate location in the vehicle. For example, driver or passenger side air bags will generally be elliptical, spherical or circular in shape, while side air curtains will generally be rectangular or oval in configuration.

The direct or transfer coating of the textile substrate with layers of polymeric coating material takes place on a coating line that has multiple coating stations with multiple dryers in sequence. In the direct coating process, the fabric substrate is heat-set and stabilized prior to applying the first (prime) polyurethane coating layer by passing it through an oven at a temperature of from about 250° F. to about 400° F. Thereafter, the fabric is coated in accordance with the invention. In the transfer coating application, the various coating materials are first transferred by laminating the multiple layers thereof to a carrier sheet and then laminating the textile or knit substrate thereto.

In one embodiment of the present invention, as shown in FIG. 1, a fabric substrate 10 is first coated on its upper or top surface 12 with an adhesive polyurethane layer 14, referred to as a prime coat or adhesive coat. The adhesive coat serves to adhesively bond the filaments of the textile substrate so they do not comb or unravel. The polyurethane used in the prime or adhesive layer 14 can be selected from among the aromatic or aliphatic polyether or polyester polyurethanes and, preferably, from among those having a solids content of from about 20% to about 75% by weight. These types of polymeric polyurethanes provide good adhesion to nylon and satisfactory hydrolysis, i.e. resistance to breakdown under ambient storage conditions, to insure that the air bag or side air curtain will be ready for use when deployed.

Preferably, the prime coat layer 14 covers the entire surface 12 of the fabric 10. Alternatively, it can be applied as a partial coating designed to coincide with a particular area of the fabric as in a design for air channels for side air curtains, etc. In addition, various patterns and coating weights can be employed to obtain the desired level of air permeability in the finished air bag.

The prime coat layer 14 is dried in an oven at from about 225° F. to about 450° F. for about 1.5 to about 3.0 minutes, while advancing the fabric at a speed of from about 300 yards per hour to about 3,000 yards per hour, with 1,200 yards per hour being preferred. In this phase of the process the polyurethane layer and the nylon substrate form a cross-linked polymer chain, thus securely adhering the adhesive layer to the base fabric substrate.

At a second coating station, a composite coating layer 16 is deposited and coated onto the prime coating layer 14. The composite coating layer 16 is comprised of from about 25% to about 100% solids by weight of an aromatic or aliphatic polyether or polyester polyurethane and polysiloxane, with an epoxy resin preferably included in the mixture. Optionally, depending upon the chemical and physical properties sought to be introduced into the air bag, additional materials are added to the polymeric composite compound as, for example, flame proofing agents, such as aluminum trihydrate, melanine, bromine, or antimony trioxide; mildew prevention agents such as BP5® by Morton Thiokol; ultraviolet and ozone resistant agents, such as Tinuvin 765® by Ciba Geigy; ultraviolet absorbent materials and Intratherm dyes. During the heating process, the composite coating layer 16 reacts with and chain extends with the prime coat layer 14 to establish a homogeneous composite layer 15 whereby both layers become cross-linked or bonded together. The coating weight of the homogeneous composite layer 15 is within the range of from about 0.5 ounces per square yard to about 14 ounces per square yard, with about 3.5 ounces per square yard being preferred. The coated fabric is then dried in an oven maintained at an elevated temperature of from about 350° F. to about 450° F.

After the composite coating layer 15 is applied, a third layer or topcoat layer 18 of an aliphatic or aromatic polyether or polyester polyurethane is coated onto the homogeneous composite layer 15. Topcoat layer 18 is designed to prevent blocking or self-sticking of the air bag layers to each other when the air bag is in its collapsed, folded condition during storage and, later, upon deployment. The coating weight of the topcoat layer is from about 0.2 to about 3.0 ounces per square yard with a coating weight of about 0.5 ounces per square yard being preferred. The topcoat layer is heated at an elevated temperature of from about 250° F. to about 400° F. for about 1.5 to from about 3.0 minutes in an oven, during which time it cross-links with the homogeneous composite layer 15.

The laminated structure shown in FIG. 1 typically forms a panel of an air bag or a side air curtain after die cutting into the desired configuration by the air bag manufacturer. A complementary laminated structure, similar to the structure of FIG. 1, forms the opposite panel of the air bag or side air curtain. In accordance with the present invention, the two panels are sealed together about their peripheries or along a predesigned configuration to form air channels for side air curtains by radio frequency (RF) heat sealing, hot air sealing or ultrasonic sealing at from about 10 to about 80 megahertz, and at from about 250° F. to about 450° F., with RF heat sealing being preferred. Sealing in this manner serves to better control the air permeability of the air bag while maintaining its integrity against air leakage, since the inherent leakage problems associated with conventional closing by stitching or sewing, are avoided. Employing an RF heat sealing system is especially important in the manufacture of air filled tubular side air curtains since air must be held in these structures for longer periods of time than with a conventional air bag. Such curtains must open within 2 to 3 milliseconds of impact and must stay inflated for about 3 to about 12 seconds after deployment in the case of multiple rollovers, e.g. three rollovers, in a single incident.

As shown in FIG. 3, the coated fabrics 30 and 40 are aligned within the RF heat sealing bars 1 and 2 in a position such that their multi-layered coating surfaces 3 and 4 face each other. When heat sealing dies 1 and 2 are closed and heat is applied, coated fabrics 30 and 40 are heat bonded together at their points of contact. In addition, predesigned heat seal cavities 4 and 5 in heat seal bar die 1 provide locations for bead formation in the heat sealing process. Heat seal bar 2 has a flat inner surface (not shown) which provides additional pressure in the bead formation. The result, as shown in FIG. 6, is a joining of coated fabrics 30 and 40 (individual coating layers not shown) with bead formed at cavities 4 and 5 in the heat seal bar die 1.

One type of straight line bead design is shown in FIG. 4 which has parallel straight line bead cavities 4 and 5. A die 7 having an alternative type of bead design is shown in FIG. 5, which includes a combination of straight line bead cavities 4 and 5 and a wavy or undulating bead cavity 6. While the bead cavities shown in FIG. 4 are preferably of a width and depth of about ⅛" and those of FIG. 5 are preferably of a width of about 0.142 " and a depth of about ⅛" in the process and equipment described herein, the bead cavities can be of any appropriate width and depth sufficient to create a strong reinforcing seal in a particular application. If desired, these and other heat seal bead cavities may be joined together as, for example, interconnecting cavities in a predesigned continuous arrangement to form closed air chambers for an air bag or a side air curtain or other type of air bag device.

Figure 2:
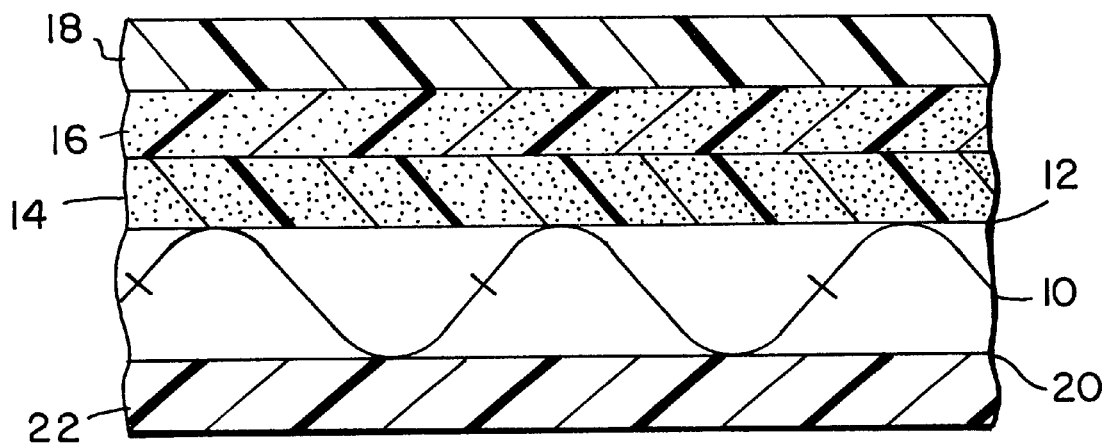
FIG. 2 is a cross-sectional view of a typical coated base fabric of the invention with an additional layer coated on the opposite side of the base fabric.

In another embodiment of the present invention, as shown in FIG. 2, the upper or outer surface 12 of fabric 10 is coated with the same coating layers 14, 16 and 18 as shown in FIG. 1. However, in this alternative embodiment, the bottom surface 20 of fabric substrate 10 has an additional layer of polymeric material 22 coated thereon. Polymeric layer 22 can be comprised of a non-sticking material such as polysiloxane or, where an adhesive or sticking application is required, an adhesive polyurethane. The coated fabric is dried in an oven at a temperature of from about 275° F. to about 450° F. at which temperature the polysiloxane coating vulcanizes with the textile substrate. The coating weight of the polymeric polysiloxane or polyurethane layer 22 on the bottom surface 20 of the textile fabric substrate is from about 0.5 ounces per square yard to about 5.0 ounces per square yard, with 1.2 ounces per square yard being preferred. This coating layer provides added protection to the textile fabric against the high temperatures encountered upon inflation with hot gases.

While the preferred embodiments of the invention have been illustrated and described, using specific terms, such description has been for illustrative purposes only, and it should be understood that changes and variations may be made thereto without departing from the spirit and scope of the invention which is defined by the claims appended hereto.

What is claimed is:

1. A coated textile fabric for an air-holding inflatable vehicle restraint system, which comprises:

(a) a woven, knitted or non-woven base textile fabric;

(b) a first surface of said textile fabric completely or partially coated with an adhesive polyurethane to form a first coating layer;

(c) said first coating layer coated with a second composite coating layer, said second composite layer being a polyurethane and a polysiloxane; and (d) a third coating layer comprised of a polymeric polyurethane material coated on said second composite layer.

2. The coated textile fabric of claim 1 wherein said composite coating layer comprises a polyurethane, a polysiloxane and an epoxy resin.

3. The coated textile fabric of claim 1 wherein said base textile fabric is selected from the group consisting of polyesters, polyamides and other synthetic fibers.

4. The coated textile fabric of claim 1 wherein said base textile fabric is comprised of woven nylon.

5. The coated textile fabric of claim 1 wherein said first coating layer is selected from the group consisting of aromatic or aliphatic polyester polyurethanes and aromatic or aliphatic polyether polyurethanes.

6. The coated textile fabric of claim 1 wherein said first polyurethane coating layer has a solids content of from about 20% to about 75% by weight.

7. The coated textile fabric of claim 1 wherein said composite coating layer is comprised of from about 25% to about 100% solids by weight of an aromatic or aliphatic polyether or polyester polyurethane, an epoxy resin and a polysiloxane.

8. A coated textile fabric for an air-holding inflatable vehicle restraint system, which comprises:

(a) a textile fabric having first and second surfaces;

(b) said first surface of said textile fabric completely or partially coated with an adhesive polyurethane to form a first coated layer;

(c) said first coating layer being coated with a composite coating layer formed of polyurethane and a polysiloxane;

(d) a third coating layer comprised of a polymeric polyurethane coated on said composite coating layer; and (e) a polymeric polyurethane or polysiloxane layer coated on said second surface of said textile fabric.

9. The coated textile fabric of claim 8, wherein said textile fabric is at least one of woven, knitted and non-woven textile fabric, or combinations thereof.

10. The coated textile fabric of claim 9 wherein said composite coating layer comprises a polyurethane, a polysiloxane and an epoxy resin.

11. The coated textile fabric of claim 10 wherein said base fabric is a woven nylon fabric.

12. The coated textile fabric of claim 8 wherein said first coating layer is selected from the group consisting of aromatic or aliphatic polyester polyurethanes and aromatic and aliphatic polyether polyurethanes.

13. The coated textile fabric of claim 8 wherein said first polyurethane coating layer has a solids content of from about 20% to about 75% by weight.

14. The coated textile fabric of claim 8 wherein said composite coating layer is comprised of from about 25% to about 100% solids by weight of an aromatic or aliphatic polyether or polyester polyurethane, an epoxy resin and a polysiloxane.

\* \* \* \* \*